US012609616B2

(12) United States Patent
Yang et al.

(10) Patent No.: US 12,609,616 B2
(45) Date of Patent: Apr. 21, 2026

(54) VOLTAGE CONVERTING DEVICE AND BOOTSTRAP CONTROL CIRCUIT THEREOF

(71) Applicant: Novatek Microelectronics Corp., Hsinchu (TW)

(72) Inventors: Tzu-Hsien Yang, Hsinchu County (TW); Yu-Tzu Chao, Kaohsiung (TW); Yung-Chou Lin, Hsinchu County (TW)

(73) Assignee: Novatek Microelectronics Corp., Hsinchu (TW)

( * ) Notice: Subject to any disclaimer, the term of this patent is extended or adjusted under 35 U.S.C. 154(b) by 220 days.

(21) Appl. No.: 18/413,075

(22) Filed: Jan. 16, 2024

(65) Prior Publication Data

US 2025/0233518 A1      Jul. 17, 2025

(51) Int. Cl.
  H02M 3/158      (2006.01)
  H02M 1/08      (2006.01)
(52) U.S. Cl.
  CPC ............. H02M 3/158 (2013.01); H02M 1/08 (2013.01)
(58) Field of Classification Search
  CPC ....... H02M 3/158; H02M 3/07; H02M 3/1588
  See application file for complete search history.

(56) References Cited

U.S. PATENT DOCUMENTS 5,365,118 A  *  11/1994  Wilcox ................. H02M 7/538
                                                      327/390
9,312,773 B2 *   4/2016  Li ........................ H03K 17/063

2010/0013452 A1    1/2010  Tang et al.
2016/0043642 A1*   2/2016  Xu ........................... H02M 1/08
                                                        323/271
2016/0065072 A1*   3/2016  Xiu ......................... H02M 1/08
                                                        323/271
2018/0054117 A1*   2/2018  Nakamura ............ H02M 3/158
2022/0209654 A1    6/2022  Jodka et al.

FOREIGN PATENT DOCUMENTS

CN          114421759        4/2022

OTHER PUBLICATIONS

"Office Action of Taiwan Counterpart Application", issued on Nov. 29, 2024, p. 1-p. 7.

* cited by examiner

*Primary Examiner* — Kyle J Moody
(74) *Attorney, Agent, or Firm* — JCIPRNET

(57)          ABSTRACT

A bootstrap control circuit includes a regulator, a capacitor, a voltage detector and a charging path controller. The regulator generates a first voltage. The capacitor is coupled between the regulator and an inductor of the DC to DC converting circuit.

The voltage detector detects a voltage difference between two ends of the capacitor to obtain a detection signal. The charging path controller turns on or cuts off a connection path between the capacitor and the inductor of the DC to DC converting circuit, and the charging path controller connects the capacitor to a reference voltage when the connection path of the capacitor and the inductor of the DC to DC converting circuit is cut off.

20 Claims, 5 Drawing Sheets

VOLTAGE CONVERTING DEVICE AND BOOTSTRAP CONTROL CIRCUIT THEREOF

BACKGROUND

Field of the Invention

The invention relates to a voltage converting device and a bootstrap control circuit thereof, and more particularly, to the voltage converting device and the bootstrap control circuit thereof which could avoid output voltage disturbance and extra conduction loss.

Description of Related Art

In a bootstrap controlled voltage converting device, a voltage converting operation could be performed by alternatively switching two transistors. A bootstrap control circuit of the voltage converting device provides a capacitor to store charges during the voltage converting operation. If the voltage converting device is turned to a light load status, the charges in the capacitor may be lost, and the bootstrap control circuit needs to provide a charging path for recharging the capacitor. In conventional art, the bootstrap control circuit always provides charging path through an inductor by turning on a lower bridge of a DC to DC converting circuit of the voltage converting device. Since the inductor stores energy during the voltage converting operation, and the energy may cause an output voltage disturbance for the recharging operation of the capacitor. Furthermore, during the recharging operation, the energy of the inductor needs to be recycled to an input end of the voltage converting device to avoid an excessive output voltage. A turn-on loss may be occurred caused by a turn on resistance of the two transistors of the voltage converting circuit, a switching loss may be induced by the two transistors which are switched alternatively.

SUMMARY

The invention provides a voltage converting device and a bootstrap control circuit thereof, which could avoid output voltage disturbance and extra conduction loss, and reduce switching loss of a DC to DC converting circuit.

According to an embodiment of the invention, the bootstrap control circuit is adapted for a DC to DC converting circuit. The bootstrap control circuit includes a regulator, a capacitor, a voltage detector and a charging path controller. The regulator generates a first voltage. The capacitor is coupled between the regulator and an inductor of the DC to DC converting circuit. The voltage detector is coupled to the capacitor in parallel to detect a voltage difference between two ends of the capacitor to obtain a detection signal. The charging path controller is coupled to the capacitor and the voltage detector. The charging path controller turns on or cuts off a connection path between the capacitor and the inductor of the DC to DC converting circuit, and the charging path controller connects the capacitor to a reference voltage when the connection path of the capacitor and the inductor of the DC to DC converting circuit is cut off.

According to an embodiment of the invention, the voltage converting device includes a DC to DC converting circuit and the bootstrap control circuit as mentioned above. The DC to DC converting circuit receives an input voltage and generating an output voltage.

To sum up, the bootstrap control circuit may determine to connect the capacitor to the reference voltage or the inductor according to the voltage difference between the two ends of the capacitor. Such as that, in a light load status, the charging path of the capacitor can be isolated from the inductor. Such as that, output voltage disturbance and extra conduction loss can be avoid, and switching loss of a DC to DC converting circuit can be reduced.

To make the above features and advantages of the invention more comprehensible, embodiments accompanied with drawings are described in detail below.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 1:
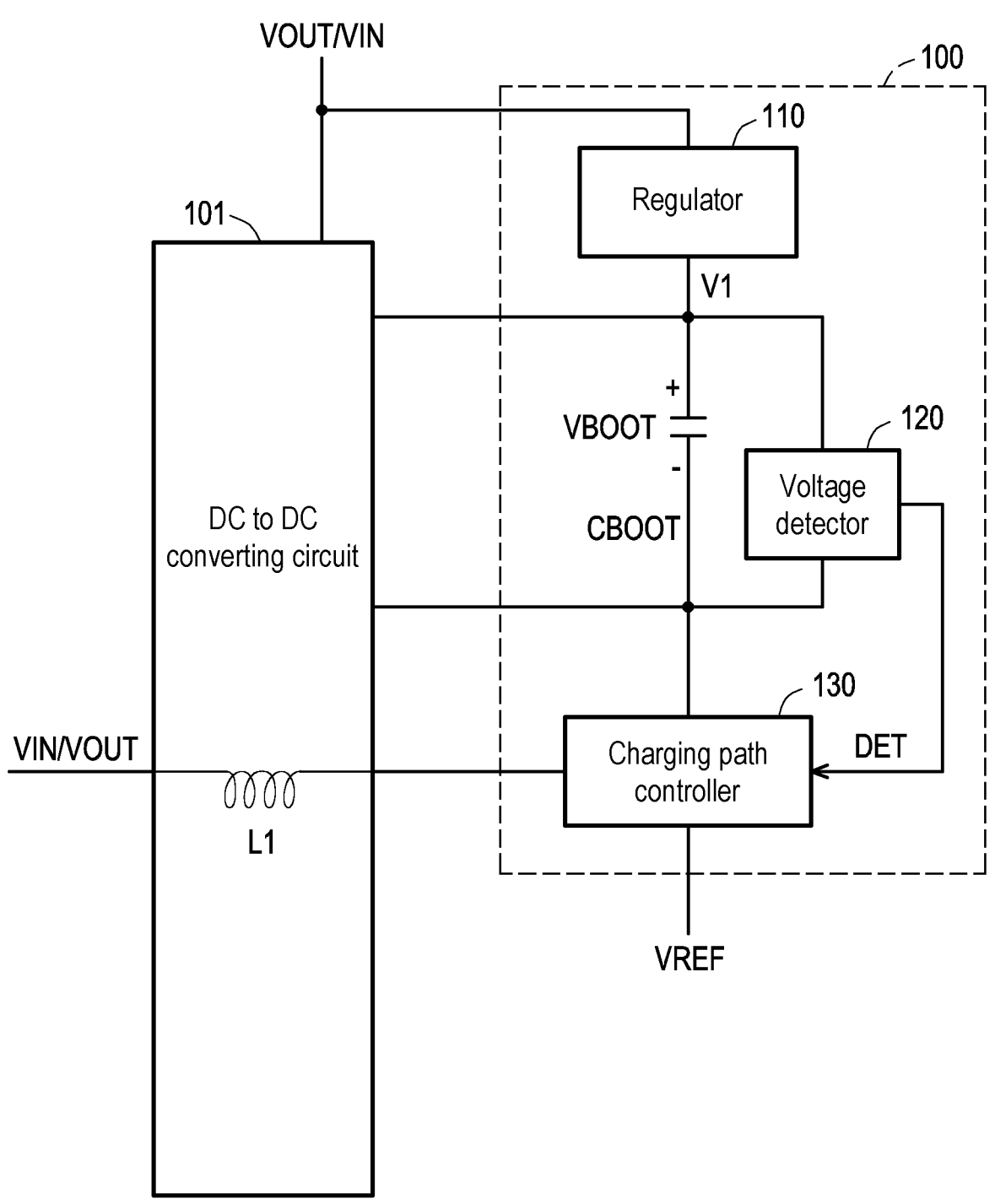
FIG. 1 illustrates a schematic diagram of a bootstrap control circuit according to an embodiment of present disclosure.

The term "couple (or connect)" throughout the specification (including the claims) of this application are used broadly and encompass direct and indirect connection or coupling means. For instance, if the disclosure describes a first apparatus being coupled (or connected) to a second apparatus, then it should be interpreted that the first apparatus could be directly connected to the second apparatus, or the first apparatus could be indirectly connected to the second apparatus through other devices or by a certain coupling means. In addition, terms such as "first" and "second" mentioned throughout the specification (including the claims) of this application are only for naming the names of the elements or distinguishing different embodiments or scopes and are not intended to limit the upper limit or the lower limit of the number of the elements not intended to limit sequences of the elements. Moreover, elements/components/steps with same reference numerals represent same or similar parts in the drawings and embodiments. Elements/components/notations with the same reference numerals in different embodiments may be referenced to the related description.

Please refer to FIG. 1, which illustrates a schematic diagram of a bootstrap control circuit according to an embodiment of present disclosure. The bootstrap control circuit 100 is adapted for a DC to DC converting circuit 101. The bootstrap control circuit 100 includes a regulator 110, a capacitor CBOOT, a voltage detector 120 and a charging path controller 130. The regulator 110 receives an input voltage VIN or an output voltage of the DC to DC converting circuit 101. The regulator 110 generates a voltage V1 according to the input voltage VIN or the output voltage VOUT. In this embodiment, the DC to DC converting circuit 101 may be a DC to DC boost converter or a DC to DC buck converter. If the DC to DC converting circuit 101 is the DC to DC boost converter, the regulator 110 may generate the voltage V1 according to the output voltage VOUT. If the DC to DC converting circuit 101 is the DC to DC buck converter, the regulator 110 may generate the voltage V1 according to the input voltage VIN. The regulator 110 may be a low-dropout (LDO) regulator.

On the other hand, a first end of the capacitor CBOOT is coupled to the regulator 110, and a second end of the capacitor CBOOT is coupled to the charging path controller 130. The second end of the capacitor CBOOT is further coupled to an inductor L1 of the DC to DC converting circuit 101 through the charging path controller 130. The voltage detector 130 is coupled to the capacitor CBOOT in parallel. The voltage detector 130 is used to detect a voltage difference VBOOT between two ends of the capacitor CBOOT to obtain a detection signal DET. The voltage detector 130 further transmits the detection signal DET to the charging path controller 130. The charging path controller 130 may turn on or cuts off a connection path between the capacitor CBOOT and the inductor L1 of the DC to DC converting circuit according to the detection signal DET. Moreover, the charging path controller 130 may connect the capacitor CBOOT to a reference voltage VREF when the connection path of the capacitor CBOOT and the inductor L1 of the DC to DC converting circuit 101 is cut off. On the contrary, when the connection path between the capacitor CBOOT and the inductor L1 of the DC to DC converting circuit 101 is turned on, the charging path controller 130 may disconnect a connection between the capacitor CBOOT and the reference voltage VREF.

In detail, in a heavy load status of the DC to DC converting circuit 101, the voltage detector 120 may generate the detection signal DET with a second logic value by detecting the voltage difference VBOOT between two ends of the capacitor CBOOT. In this case, the charging path controller 130 may turn on the connection path between the capacitor CBOOT and the inductor L1, and the capacitor CBOOT could be charged by voltage toggles of the inductor L1 based on the input voltage VIN or the output voltage VOUT.

When the DC to DC converting circuit 101 is turned to a light load status from the heavy load status, a charge of the capacitor CBOOT may be reduced. At this time, the voltage detector 130 may detect that a voltage value of the voltage difference VBOOT between two ends of the capacitor CBOOT is lower than a threshold value, and the voltage detector 130 may generate the detection signal DET with a first logic value. In response to the detection signal DET with the first logic value, the charging path controller 130 may cut off the connection path between the inductor L1 and the capacitor CBOOT. On the other hand, the charging path controller 130 may connect the capacitor CBOOT to a reference voltage VREF to establish another charging path. Such as that, the capacitor CBOOT could be charged based on the reference voltage VREF.

It can be seen, in the light load status, the capacitor CBOOT is disconnected from the inductor L1, and the capacitor CBOOT is charged based on the reference voltage VREF. Also, in the light load status, the inductor L1 needs not to release charges to the capacitor CBOOT, and DC to DC converting circuit 101 may generate the output voltage VOUT with stable voltage value. A conduction loss caused by a current of the inductor L1 during a charging process could be avoid, and an efficiency of the DC to DC converting circuit 101 in the light load status could be improved.

It should be noted here, in this embodiment, the reference voltage VREF may be reference ground voltage, or the reference voltage VREF may be generated according to the input voltage VIN or the output voltage VOUT of the DC to DC converting circuit 101. For example, if the DC to DC converting circuit 101 is the DC to DC boost converter, the reference voltage VREF might be equal to the input voltage VIN subtracting a bias voltage. If the DC to DC converting circuit 101 is the DC to DC buck converter, the reference voltage VREF might be equal to the output voltage VOUT subtracting the bias voltage. In here, a voltage value of the bias voltage may be determined by a designer of the DC to DC converting circuit 101, and no special limitation here.

Figure 2:
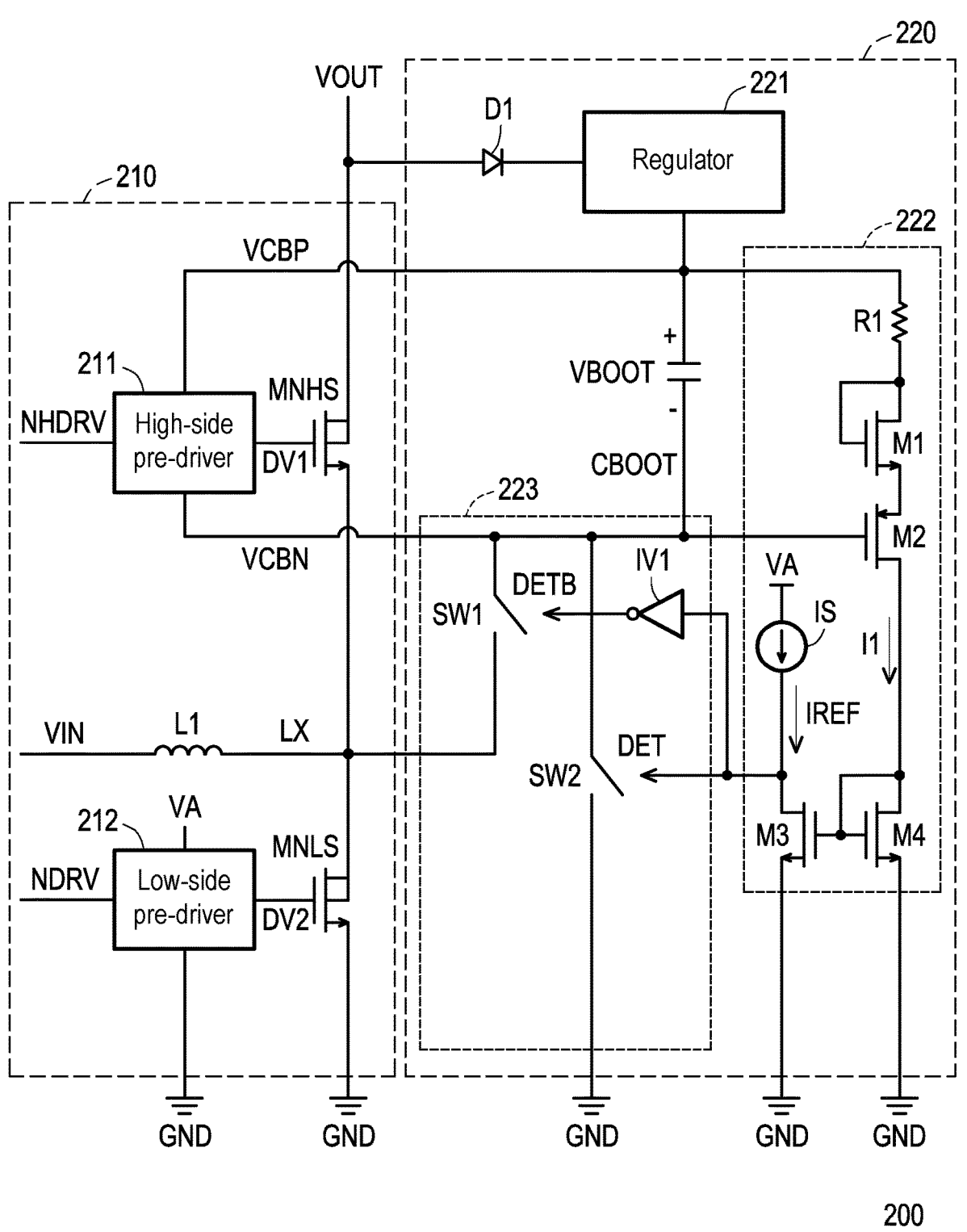
FIG. 2 illustrates a circuit diagram of a voltage converting device according to an embodiment of present disclosure.

Please refer to FIG. 2, which illustrates a circuit diagram of a voltage converting device according to an embodiment of present disclosure. The voltage converting device 200 includes a DC to DC converting circuit 210 and a bootstrap control circuit 220. The DC to DC converting circuit 210 includes a high-side pre-driver 211, a low-side pre-driver 212, an inductor L1 and transistors MNHS and MNLS. The transistors MNHS and MNLS are coupled is series between an output voltage VOUT and a reference ground end GND. The transistors MNHS and MNLS may be N type transistors. The MNHS and MNLS are respectively driving by the high-side pre-driver 211 and the low-side pre-driver 212. A power end of the high-side pre-driver 211 receives a power voltage VCBP and a reference ground end of the high-side pre-driver 211 receives a reference voltage VCBN. The high-side pre-driver 211 further receives a control signal NHDRV, and generates a driving signal DV1 according to the control signal NHDRV. The driving signal DV1 is provided to a gate of the transistor MNHS, and the driving signal DV1 could be transited between the power voltage VCBP and the reference voltage VCBN.

A power end of the low-side pre-driver 212 receives a power voltage VA and a reference ground end of the low-side pre-driver 212 is coupled to the reference ground end GND. The low-side pre-driver 212 further receives a control signal NDRV, and generates a driving signal DV2 according to the control signal NDRV. The driving signal DV2 is provided to a gate of the transistor MNLS, and the driving signal DV2 could be transited between the power voltage VA and a voltage of the reference ground end GND.

A first end of the inductor L1 receives an input voltage VIN, and a second end of the inductor L1 is coupled to a coupling end of the transistors MNHS and MNLS.

The transistors MNHS and MNLS may be switched alternatively according to the driving signals DV1 and DV2 to convert the input voltage VIN through the inductor L1 to generate an output voltage VOUT. In this embodiment, the DC to DC converting circuit 210 is a DC to DC boost converter, and the output voltage VOUT may be larger than the input voltage VIN.

The bootstrap control circuit 220 includes a regulator 221, a capacitor CBOOT, a voltage detector 222 and a charging path controller 223. The regulator 221 may receive the output voltage VOUT through a diode D1. The regulator 221 may generate the power voltage VCBP according to the output voltage VOUT. In this embodiment, the regulator 221 may be a low-dropout (LDO) regulator. One end of the capacitor CBOOT is coupled to the regulator 221 to receive the power voltage VCBP. Another end of the capacitor CBOOT receives the reference voltage VCBN, and is coupled to the voltage detector 222 and the charging path controller 223.

The voltage detector 222 is coupled to the two ends of the capacitor CBOOT, and receives the power voltage VCBP and the reference voltage VCBN. The voltage detector 222 is used to detect a voltage difference VBOOT between the two ends of the capacitor CBOOT. In this embodiment, the voltage detector 222 may include a resistor R1 and transistors M1 and M2. The resistor R1 and the transistors M1 and M2 are coupled in series and form a first current generator. The transistor M1 is connected to a diode configuration. In FIG. 2, the resistor R1 is coupled to an anode of the diode formed by the transistor M1, a first end of the transistor M2 is coupled to the cathode of the diode formed by the transistor M1, and a control end of the transistor M2 is coupled to the lower end of the capacitor CBOOT. The first current generator formed by the resistor R1 and transistors M1 and M2 may generate a current I1 according to the voltage difference VBOOT through a second end of the transistor M2.

The voltage detector 222 further includes a second current generator IS and a current comparator formed by transistors M3 and M4. A control end and a first end of the transistor M4 are coupled together to receive the current I1. A control end of the transistor M3 and a control end of the transistor M4 are coupled together, the first end of the transistor M3 receives the reference current IREF generated by the second current generator IS. The transistors M3 and M4 form a current mirror circuit and mirrors the current I1 to the first end of the transistor M3. Such as that, the reference current IREF could be compared by the current I1. If the reference current IREF is larger than the current I1, a detection signal DET could be pull-up to a high logic value (a first logic value); and if the reference current IREF is smaller than the current I1, the detection signal DET could be pull-down to a low logic value (a second logic value). In additional, second ends of the transistor M3 and of the transistor M4 are coupled to the reference ground end GND.

Besides, the charging path controller 223 includes switches SW1 and SW2 and an inverter IV1. The inverter IV1 receives the detection signal to generate an inverted detection signal DETB by inverting the detection signal DET. The switches SW1 and SW2 are respectively controlled by the inverted detection signal DETB and the detection signal DET.

In this embodiment, if the detection signal DET is at the high logic value, the switch SW1 may be cut off and the switch SW2 may be turned on. That is, in this manner, a connection path between the inductor L1 and the capacitor CBOOT is cut off by the switch SW1. The capacitor CBOOT is coupled to the reference ground end GND to receive a reference voltage by the switch SW2. On the other hand, if the detection signal DET is at the low logic value, the switch SW1 may be turned on and the switch SW2 may be cut off. That is, in this manner, the connection path between the inductor L1 and the capacitor CBOOT is turned on by the switch SW1, and the capacitor CBOOT may be isolated from the reference ground GND by the switch SW2.

Figure 3:
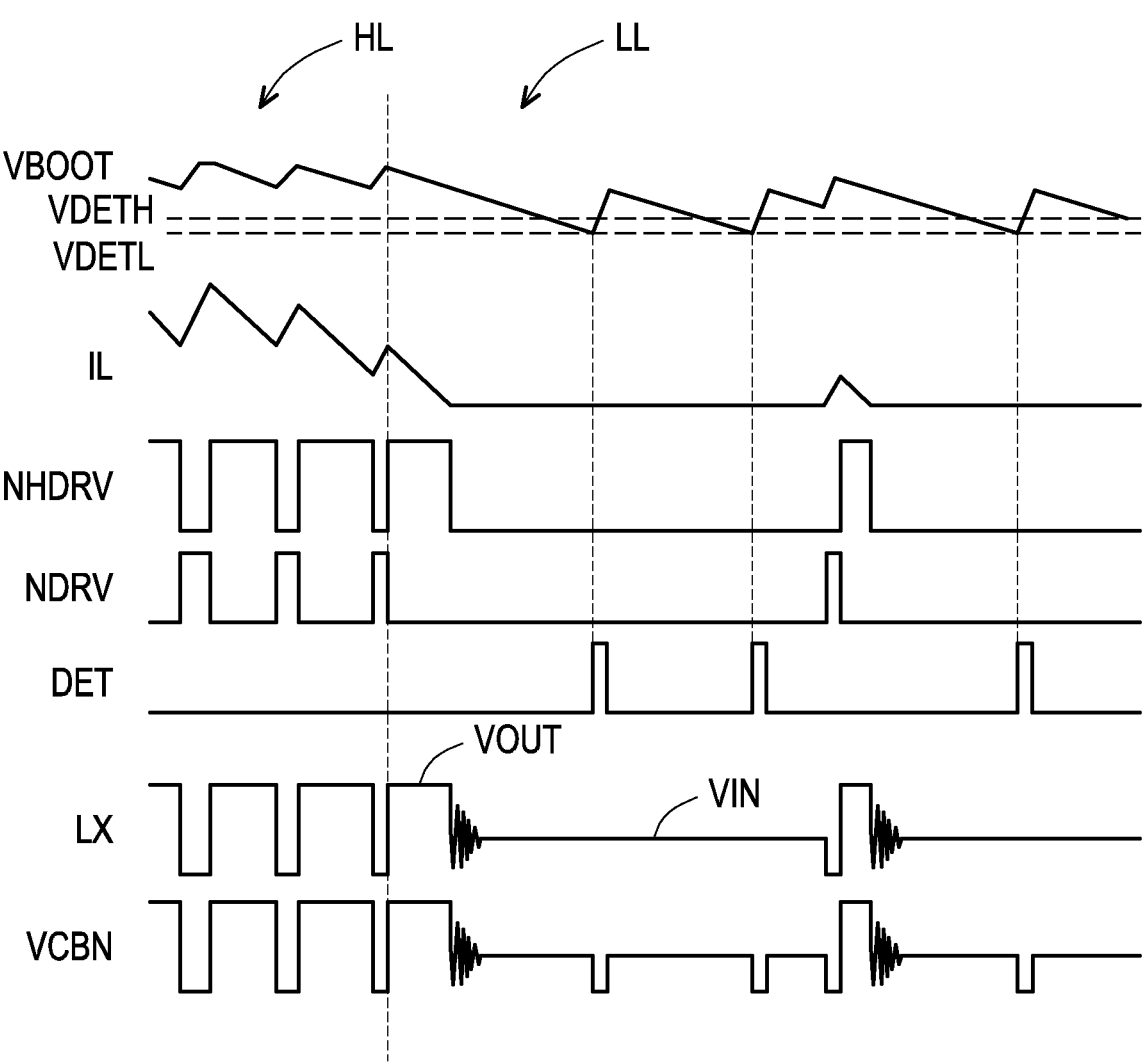
FIG. 3 illustrates a waveform plot of the voltage converting device 200.

Please refer to FIG. 2 and FIG. 3 commonly, wherein FIG. 3 illustrates a waveform plot of the voltage converting device 200. In FIG. 3, during a heavy load status HL, the transistors MNHS and MNLS are switched alternatively according to the control signals NHDRV and NDRV. The control signals NHDRV and NDRV are complementary to each other. A voltage LX at the coupling end between the inductor L1 and the transistors MNHS and MNLS is transited between two voltage values, and a highest voltage value of the voltage LX may equal to the output voltage VOUT. In the heavy load status HL, the voltage difference VBOOT between the two ends of the capacitor CBOOT may be higher than a threshold value VDETL, and the detection signal DET generated by the voltage detector 222 may keep on the low logic value.

When the voltage converting device 200 turns to a light load status LL from the heavy load status HL, a switching frequency of the control signals NHDRV and NDRV is reduced. A current IL on the inductor is reduced correspondingly. The voltage difference VBOOT of the two ends between the capacitor CBOOT may drop to lower than a threshold value VDETH and reach to the threshold value VDETL. When the voltage difference VBOOT between the two ends of the capacitor CBOOT reaches the threshold value VDETL, the voltage detector 222 may generate the detection signal DET with the high logic value. The charging path controller 223 may switch the capacitor CBOOT to be coupled to the reference ground end GND from the inductor L1, and the reference voltage VCBN is pulled to the reference ground voltage when the detection signal DET is at the high logic value.

On the other hand, if the voltage difference VBOOT between the two ends of the capacitor CBOOT is charged up to higher than the threshold value VDETH, the voltage detector 222 may pull-down the detection signal DET to the low logic value. The charging path controller 223 may re-connect the capacitor CBOOT to the inductor L1, and cut-off the connection path between the capacitor CBOOT and the reference ground end GND.

In additional, in the light load status LL, the voltage LX may equal to the input voltage VIN. Besides, the threshold values VDETH and VDETL may be set by adjusting at least one of a resistance of the resistor R1, a turn-on voltage of the diode formed by the transistor M1, a threshold voltage of the transistor M2, a current value of the reference current IS and a mirror ratio of the current mirror formed by the transistors M3 and M4.

Figure 4:
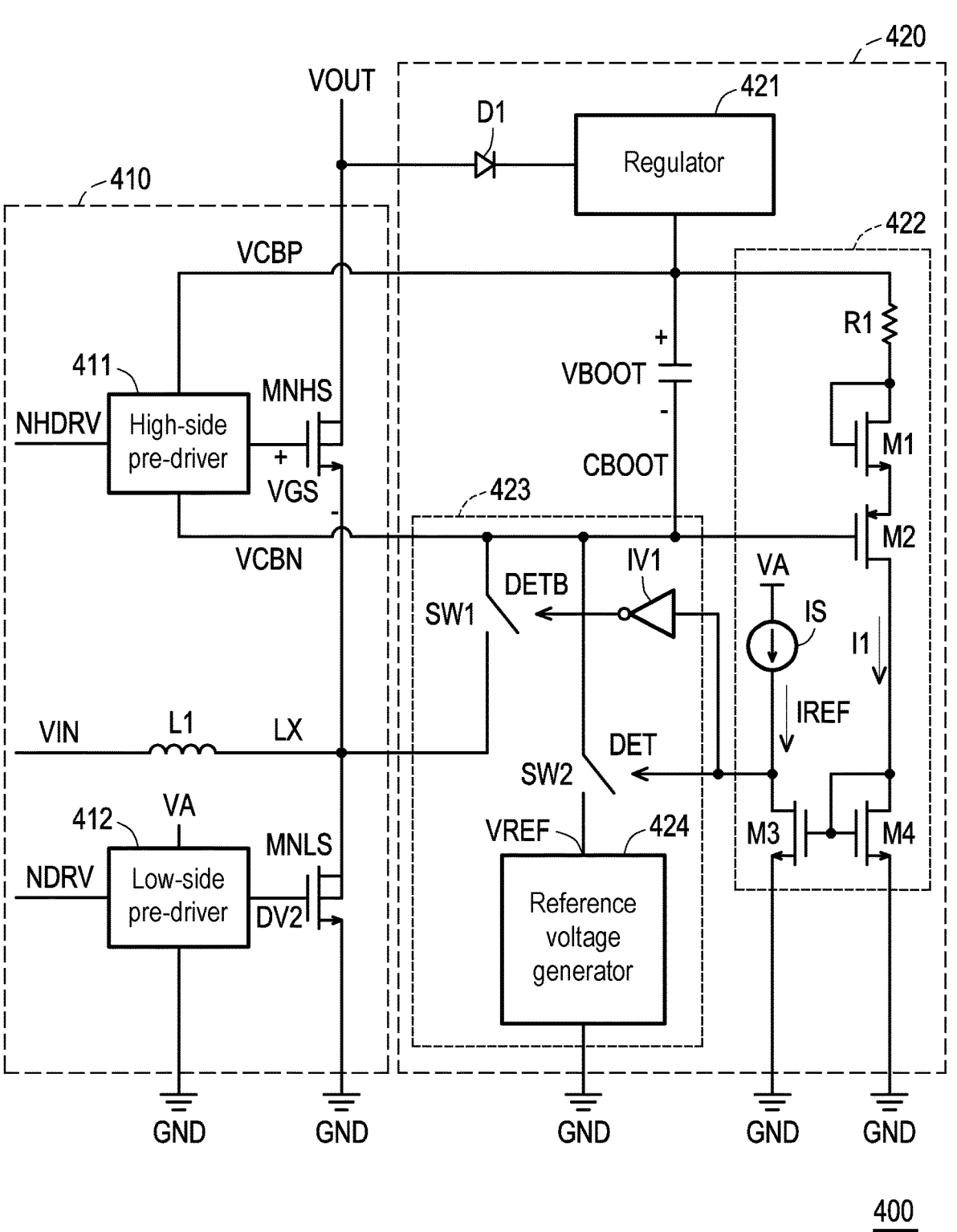
FIG. 4 illustrates a circuit diagram of a voltage converting device according to an embodiment of present disclosure.

Please refer to FIG. 4, which illustrates a circuit diagram of a voltage converting device according to an embodiment of present disclosure. The voltage converting device 400 includes a DC to DC converting circuit 410 and a bootstrap control circuit 420. Details of the DC to DC converting circuit 410 is similar to the DC to DC converting circuit 210 in the embodiment of FIG. 2, and no more repeated descriptions here.

The bootstrap control circuit 420 includes a regulator 421, a capacitor CBOOT, a voltage detector 422 and a charging path controller 423 and a reference voltage generator 424. Different from the bootstrap control circuit 220 in FIG. 2, the bootstrap control circuit 420 of presented embodiment further includes the reference voltage generator 424. The reference voltage generator 424 is coupled to the switch SW2, and provides a reference voltage VREF to the switch SW2. If the switch SW2 is turned on, the capacitor CBOOT could be charged based on the reference voltage VREF.

If one embodiment, the reference voltage generator 424 may provide a reference ground voltage as the reference voltage VREF. In other embodiments, the reference voltage generator 424 may generate the reference voltage VREF according to an input voltage VIN of the DC to DC converting circuit 410. The reference voltage generator 424 may be a low dropout (LDO) regulator, and the reference voltage generator 424 may generate the reference voltage VREF by subtracting the input voltage VIN of the DC to DC converting circuit 410 with a bias voltage.

It should be noted here, in a light load status, the transistors MNHS and MNLS are cut-off. A voltage LX at the coupling end between the inductor L1 and the transistors MNHS and MNLS equals to the input voltage VIN. When the capacitor CBOOT is charged through the charging path controller 423, if the reference voltage VREF is 0V, the reference voltage VCBN would be pulled to 0V when the switch SW2 is turned on. Such as that, a gate to source voltage VGS of the transistor MNHS may equal −VIN. In this embodiment, since an absolute value of the gate to source voltage VGS needs to be smaller than a certain voltage value (i.e. 5V), such as that, the input voltage VIN may be limited.

For the reason discussed above, in this embodiment, the reference voltage generator 424 may generate the reference voltage VREF by subtracting the input voltage VIN of the DC to DC converting circuit 410 with a bias voltage, wherein the bias voltage may have the certain voltage value. That is, the input voltage VIN is not limited in present embodiment.

Figure 5:
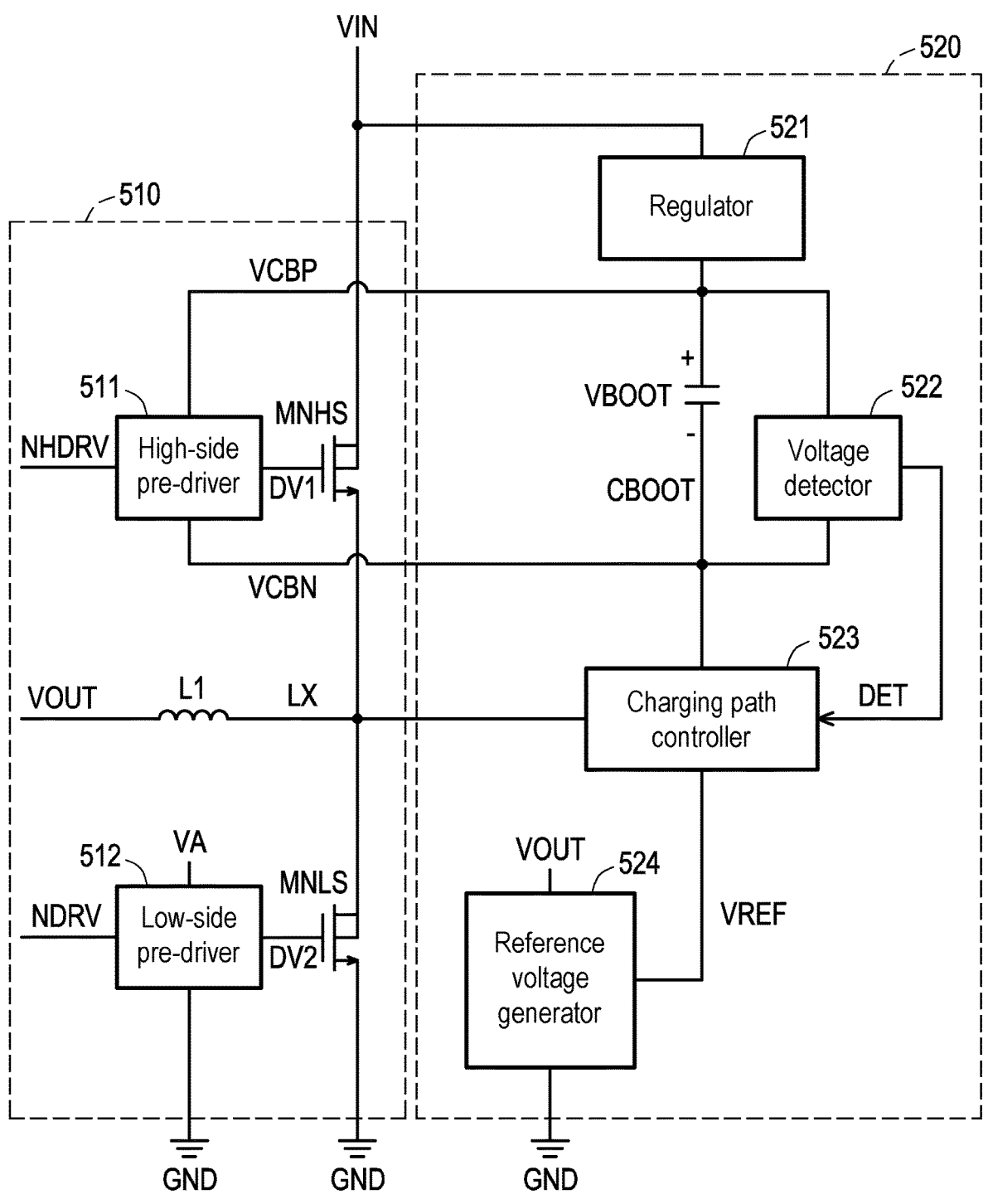
FIG. 5 illustrates a circuit diagram of a voltage converting device according to another embodiment of present disclosure.

Please refer to FIG. 5, which illustrates a circuit diagram of a voltage converting device according to another embodiment of present disclosure. The voltage converting device 500 includes a DC to DC converting circuit 510 and a bootstrap control circuit 520. The DC to DC converting circuit 510 is a DC to DC buck converter. The DC to DC converting circuit 510 includes transistors MNHS, MNLS, a high-side pre-driver 511, a low-side pre-driver 512 and an inductor L1. Different from the DC to DC converting circuit 210 in FIG. 2, in presented embodiment, the DC to DC converting circuit 510 receives an input voltage VIN by a first end of the transistor MNHS, and the DC to DC converting circuit 510 generates an output voltage VOUT by one end of the inductor L1. Wherein, another one end of the inductor L1 is coupled to a coupling end between the transistors MNHS and MNLS.

On the other hand, the bootstrap control circuit 520 includes a capacitor CBOOT, a regulator 521, a voltage detector 522, a charging path controller 523 and a reference voltage generator 524. In this embodiment, the regulator 521 receives the input voltage VIN and generates a power voltage VCBP according to the input voltage VIN. One end of the capacitor CBOOT receives the power voltage VCBP and another end of the capacitor CBOOT receives a reference voltage VCBN. The voltage detector 522 generates a detection signal DET by detecting a voltage difference VBOOT between the two ends of the capacitor CBOOT. The charging path controller 523 receives the detection signal DET, and determines to connect a lower end of the capacitor CBOOT to the inductor L1 or the reference voltage generator 524 according to the detection signal DET. The reference voltage generator 524 may receive the output voltage VOUT, and generate and provide a reference voltage VREF to the capacitor CBOOT. In this embodiment, the reference voltage VREF may equal the output voltage VOUT subtracting a bias voltage, wherein the bias voltage may have the certain voltage value.

If the reference voltage VREF is 0V, when the capacitor CBOOT is charged through the charging path controller 523, the voltage VCBN may be pulled to the reference voltage VREF (=0V). At this time, the gate to source voltage VGS of the transistor MNHS may equal to −VOUT. When the gate to source voltage VGS is limited to be less than 5V, an operation range of the output voltage VOUT is restricted.

In this embodiment, the reference voltage generator 524 may generate the reference voltage VREF by subtracting the output voltage VOUT of the DC to DC converting circuit 510 with the bias voltage. Such as that, when the output voltage VOUT is larger than 5V, an absolute value of the gate to source voltage VGS of the transistor MNHS may be kept on 5V, and value of the output voltage VOUT is not restricted.

It should be noted here, since the DC to DC converting circuit 510 is the DC to DC buck converter, the input voltage VIN Is larger than the output voltage VOUT.

It will be apparent to those skilled in the art that various modifications and variations could be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A bootstrap control circuit, adapted for a DC to DC converting circuit, comprising:
   a regulator, generating a first voltage;
   a capacitor, coupled between the regulator and an inductor of the DC to DC converting circuit;
   a voltage detector, coupled to the capacitor in parallel to detect a voltage difference between two ends of the capacitor to obtain a detection signal; and
   a charging path controller, coupled to the capacitor and the voltage detector,
   wherein the charging path controller turns on or cuts off a connection path between the capacitor and the inductor of the DC to DC converting circuit, and the charging path controller connects the capacitor to a reference voltage when the connection path of the capacitor and the inductor of the DC to DC converting circuit is cut off.

2. The bootstrap control circuit as claimed in claim 1, wherein the charging path controller comprises:
   a first switch, coupled between the capacitor and the inductor of the DC to DC converting circuit, wherein the first switch is controlled by the detection signal; and
   a second switch, coupled between the capacitor and the reference voltage, wherein the second switch is controlled by the detection signal.

3. The bootstrap control circuit as claimed in claim 2, wherein the charging path controller further comprises:
   an inverter, coupled to the voltage detector and the first switch, and generates an inverted detection signal according to the detection signal,
   wherein the inverter transmits the inverted detection signal to the first switch, and on/off statuses of the first switch and the second switch are different.

4. The bootstrap control circuit as claimed in claim 1, wherein the voltage detector generates a first current according to the voltage difference between the two ends of the capacitor, and generates the detection signal by comparing the first current with a reference current.

5. The bootstrap control circuit as claimed in claim 4, wherein when the first current is smaller than the reference current, the voltage detector generates the detection signal with a first logic value; when the first current is larger than the reference current, the voltage detector generates the detection signal with a second logic value,
   wherein the first logic value and the second logic value are different.

6. The bootstrap control circuit as claimed in claim 4, wherein the voltage detector comprises:
   a first current generator, coupled to the capacitor in parallel, generating the first current according to the voltage difference of the two ends of the capacitor;
   a second current generator, generating the reference current; and
   a current comparator, coupled to the first current generator and the second current generator, receiving and comparing the first current and the second current to generate the detection signal.

7. The bootstrap control circuit as claimed in claim 6, wherein the current comparator comprises:

a first transistor, having a first end coupled to the first current generator to receive the first current, a second end of the first transistor is coupled to a reference ground end, and a control end of the first transistor is coupled to the first end of the first transistor; and a second transistor, having a first end coupled to the second current generator to receive the reference current, a second end of the second transistor is coupled to the reference ground end, and a control end of the second transistor is coupled to the control end of the first transistor, wherein the detection signal is generated at the first end of the second transistor.

8. The bootstrap control circuit as claimed in claim 6, wherein the first current generator comprises:

a resistor, a diode and a transistor, coupled in series, wherein the resistor and diode are coupled between a first end of the capacitor and a first end of the transistor, a control end of the transistor is coupled to a second end of the capacitor, and a second end of the transistor generates the first current.

9. The bootstrap control circuit as claimed in claim 1, wherein the reference voltage is a ground voltage.

10. The bootstrap control circuit as claimed in claim 1, wherein the reference voltage is generated according to an input voltage or an output voltage of the DC to DC converting circuit.

11. The bootstrap control circuit as claimed in claim 10, further comprising:

a reference voltage generator, coupled to the charge path controller, providing the reference voltage by subtracting the input voltage or the output voltage of the DC to DC converting circuit with a bias voltage.

12. A voltage converting device, comprising:

a DC to DC converting circuit, receiving an input voltage and generating an output voltage; and a bootstrap control circuit, coupled to the DC to DC converting circuit, wherein the bootstrap control circuit comprises:

a regulator, generating a first voltage;

a capacitor, coupled between the regulator and an inductor of the DC to DC converting circuit;

a voltage detector, coupled to the capacitor in parallel to detect a voltage difference between two ends of the capacitor to obtain a detection signal; and a charging path controller, coupled to the capacitor and the voltage detector, wherein the charging path controller turns on or cuts off a connection path between the capacitor and the inductor of the DC to DC converting circuit, and the charging path controller connects the capacitor to a reference voltage when the connection path of the capacitor and the inductor of the DC to DC converting circuit is cut off.

13. The voltage converting device as claimed in claim 12, wherein the charging path controller comprises:

a first switch, coupled between the capacitor and the inductor of the DC to DC converting circuit, wherein the first switch is controlled by the detection signal; and a second switch, coupled between the capacitor and the reference voltage, wherein the second switch is controlled by the detection signal.

14. The voltage converting device as claimed in claim 13, wherein the charging path controller further comprises:

an inverter, coupled to the voltage detector and the first switch, and generates an inverted detection signal according to the detection signal, wherein the inverter transmits the inverted detection signal to the first switch, and on/off statuses of the first switch and the second switch are different.

15. The voltage converting device as claimed in claim 12, wherein the voltage detector generates a first current according to the voltage difference between the two ends of the capacitor, and generates the detection signal by comparing the first current with a reference current.

16. The voltage converting device as claimed in claim 15, wherein when the first current is smaller than the reference current, the voltage detector generates the detection signal with a first logic value; when the first current is larger than the reference current, the voltage detector generates the detection signal with a second logic value, wherein the first logic value and the second logic value are different.

17. The voltage converting device as claimed in claim 15, wherein the voltage detector comprises:

a first current generator, coupled to the capacitor in parallel, generating the first current according to the voltage difference of the two ends of the capacitor;

a second current generator, generating the reference current; and a current comparator, coupled to the first current generator and the second current generator, receiving and comparing the first current and the second current to generate the detection signal.

18. The voltage converting device as claimed in claim 12, wherein the reference voltage is a ground voltage.

19. The voltage converting device as claimed in claim 12, wherein the bootstrap control circuit further comprises:

a reference voltage generator, coupled to the charge path controller, providing the reference voltage by subtracting the input voltage or the output voltage of the DC to DC converting circuit with a bias voltage.

20. The voltage converting device as claimed in claim 12, wherein the DC to DC converting circuit is a boost converter or a buck converter.

*   *   *   *   *